US012760809B2

(12) United States Patent
Yu

(10) Patent No.: US 12,760,809 B2
(45) Date of Patent: Oct. 13, 2026

(54) SAFETY VALVE

(71) Applicant: MODEL SOLUTION CO., LTD., Seoul (KR)

(72) Inventor: Ji-Ho Yu, Incheon (KR)

(73) Assignee: MODEL SOLUTION CO., LTD., Seoul (KR)

( * ) Notice: Subject to any disclaimer, the term of this patent is extended or adjusted under 35 U.S.C. 154(b) by 0 days.

(21) Appl. No.: 19/057,530

(22) Filed: Feb. 19, 2025

(65) Prior Publication Data

US 2025/0189052 A1 Jun. 12, 2025

Related U.S. Application Data

(62) Division of application No. 18/342,193, filed on Jun. 27, 2023, now Pat. No. 12,379,038.

(30) Foreign Application Priority Data

Aug. 23, 2022 (KR) ........................ 10-2022-0105813

(51) Int. Cl.
*F16K 17/02* (2006.01)
*H01M 50/325* (2021.01)

(52) U.S. Cl.
CPC ........... *F16K 17/02* (2013.01); *H01M 50/325* (2021.01)

(58) Field of Classification Search
CPC .. F16K 17/02; F16K 17/0453; F16K 17/0446; F16K 15/021; H01M 50/325;
(Continued)

(56) References Cited

U.S. PATENT DOCUMENTS 2,112,641 A * 3/1938 Wheaton ................. F16K 17/19 137/493.1
2,930,399 A * 3/1960 Babson ..................... A01J 5/04 137/853
(Continued)

FOREIGN PATENT DOCUMENTS

EP 3 284 985 A1 2/2018
JP 02119048 A * 5/1990
(Continued)

OTHER PUBLICATIONS

Extended European Search Report issued Jan. 22, 2024 in European Application No. 23184787.2.

*Primary Examiner* — Jessica Cahill
(74) *Attorney, Agent, or Firm* — Sughrue Mion, PLLC

(57) ABSTRACT

A safety valve mounted on a battery includes a main body having a hollow structure with a top communicating with a bottom and a discharge hole in one side surface of an upper portion, a sub body protruding from an inner circumferential surface of the main body and having a through hole in one side surface of a lower portion thereof, a cap membrane having a circular cap shape and a "⊂"-shaped cross section so that the cap membrane is in close contact with an upper portion of the sub body to close the upper portion due to its weight or moves upward from the upper portion of the sub body to open the upper portion, and a cover for opening or closing the upper portion of the main body, wherein a protrusion is formed on an inner circumferential surface of an end portion of the cap membrane.

2 Claims, 9 Drawing Sheets

(58) Field of Classification Search
CPC .............. H01M 50/308; H01M 50/317; Y10T 137/789; Y10T 137/7889; Y10T 137/7894; Y10T 137/7909; Y10T 137/7921
See application file for complete search history.

(56) References Cited

U.S. PATENT DOCUMENTS

| | | | | | |
|---|---|---|---|---|---|
| 4,294,895 | A * | 10/1981 | Atkins | H01M 50/308 429/84 |
| 4,576,879 | A * | 3/1986 | Nakazawa | H01M 50/112 429/88 |
| 5,258,243 | A | 11/1993 | Cannone | |
| 6,376,119 | B1 | 4/2002 | Nann | |
| 7,951,474 | B2 | 5/2011 | Schembri | |
| 10,978,685 | B2 | 4/2021 | Koch | |
| 11,047,508 | B2 | 6/2021 | Sanders | |
| 2002/0177033 | A1 * | 11/2002 | Doyama | H01M 50/655 429/72 |
| 2008/0166625 | A1 * | 7/2008 | Schembri | H01M 50/308 429/53 |
| 2014/0141292 | A1 | 5/2014 | Lee et al. | |

FOREIGN PATENT DOCUMENTS

| | | | |
|---|---|---|---|
| JP | 07-83339 | A | 3/1995 |
| JP | 2005332767 | A | 12/2005 |
| KR | 10-2005-0020036 | A | 3/2005 |
| KR | 10-0494360 | B1 | 5/2005 |
| KR | 10-0576250 | B1 | 4/2006 |
| KR | 10-1268296 | B1 | 5/2013 |
| KR | 10-1831817 | B1 | 2/2018 |

* cited by examiner

1.

SAFETY VALVE

CROSS-REFERENCE TO RELATED APPLICATION(S)

This application is a divisional application of U.S. application Ser. No. 18/342,193, filed on Jun. 27, 2023, which claims priority from Korean Patent Application No. 10-2022-0105813, filed on Aug. 23, 2022 in the Korean Intellectual Property Office, the disclosure of which is incorporated herein by reference in its entirety.

BACKGROUND

1. Field

The following description relates to a safety valve, and more specifically, to a safety valve for discharging gas to the outside when a pressure in a vehicle battery reaches a set pressure.

2. Description of Related Art

In general, lead storage batteries applied to vehicles have structures in which a plurality of cells are connected in series to obtain high output power. In addition, one cell basically includes a positive plate formed of lead oxide, a negative plate formed of lead, a separator, an electrolyte formed of dilute sulfuric acid, a cell case, and the like.

The lead storage batteries are charged and discharged through oxidation and reduction reactions. However, when the lead storage batteries are charged and discharged, oxygen and hydrogen gases are generated. In addition, gas is generated when the cell is overcharged. When the gas is accumulated in the battery cell, a pressure rises, and there is a fire risk of the cell due to the high pressure.

Accordingly, a safety valve configured to maintain a constant pressure in a battery cell by discharging gas to the outside when a pressure in the battery cell reaches a set pressure is required.

RELATED ART

Patent Document (Patent Document 1) Korean Patent Registration No. 10-1831817 (Feb. 19, 2018)

SUMMARY

Embodiments of the present invention are directed to providing a safety valve having a simple structure and a small operating pressure error and configured to effectively discharge gas in the battery to maintain a constant pressure in a battery.

In one aspect of the present invention, a safety valve, which is mounted on a battery and operates to maintain a predetermined internal pressure in the battery when the predetermined pressure or more is applied to the battery, includes a main body, a sub body, a cap membrane, and a cover, and a protrusion is formed on an end portion of the cap membrane to be in line contact with an outer surface of the sub body. The main body has a hollow structure formed so that a top communicates with a bottom and a discharge hole in one side surface of an upper portion. The sub body is formed to protrude from an inner circumferential surface of the main body, and a through hole is formed in one side surface of a lower portion of the sub body. The cap membrane is formed so that a cross section is formed in a "⊂" shape to cover an upper portion of the sub body due to a weight of the cap membrane. A cover opens or closes the upper portion of the main body. The protrusion is formed on the end portion of the cap membrane to be in line contact with the outer surface of the sub body.

In another aspect of the present invention, a safety valve includes a main body, a sub body, a cap membrane, and a cover, and a protrusion may be formed on an outer surface of the sub body to be in line contact with an end portion of the cap membrane.

In still another aspect of the present invention, ventilation grooves may be formed at predetermined intervals in an upper surface of a sub body According to yet another aspect of the present invention, an air vent may be formed in a side surface of a sub body.

According to yet another aspect of the present invention, a hook protrusion protruding inward along an edge of an upper surface of a cover may be formed.

According to yet another aspect of the present invention, a seating groove may be formed in an upper surface of a cap membrane, and a safety valve may further include a weight adjusting member provided with weights at two ends and seated in the seating groove.

According to yet another aspect of the present invention, a hook part protruding inward along an edge of an upper surface of the cap membrane may be formed, and a weight plate may be seated inside the hook part.

DETAILED DESCRIPTION

The above-described aspects and additional aspects of the invention will be clear through the embodiments described below. In this specification, the same number is assigned to a corresponding component in each drawing. In addition, a shape or size of a component may be exaggerated compared to an actual component. In addition, a specific description for the related art will be omitted when deemed to unnecessarily obscure the gist of the present invention.

Figure 1:
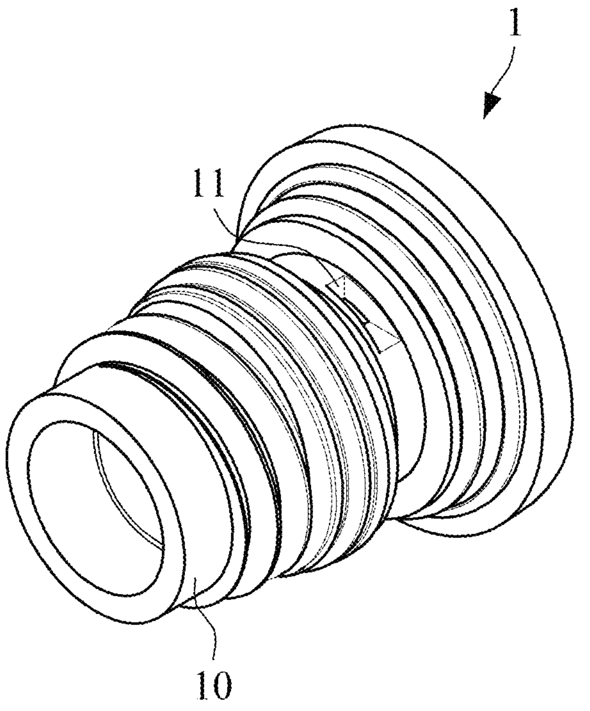
FIG. 1 is a perspective view illustrating a safety valve according to one embodiment of the present invention.
Figure 2:
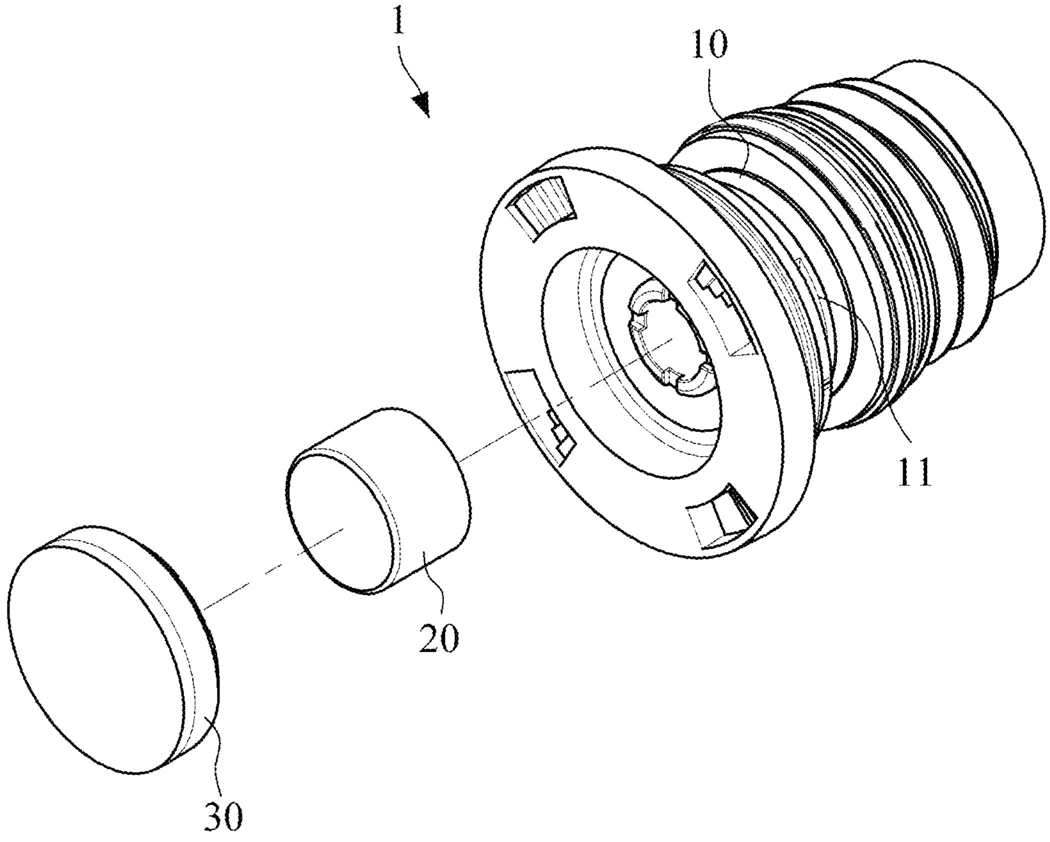
FIG. 2 is an exploded perspective view illustrating the safety valve illustrated in FIG. 1.
Figure 3:
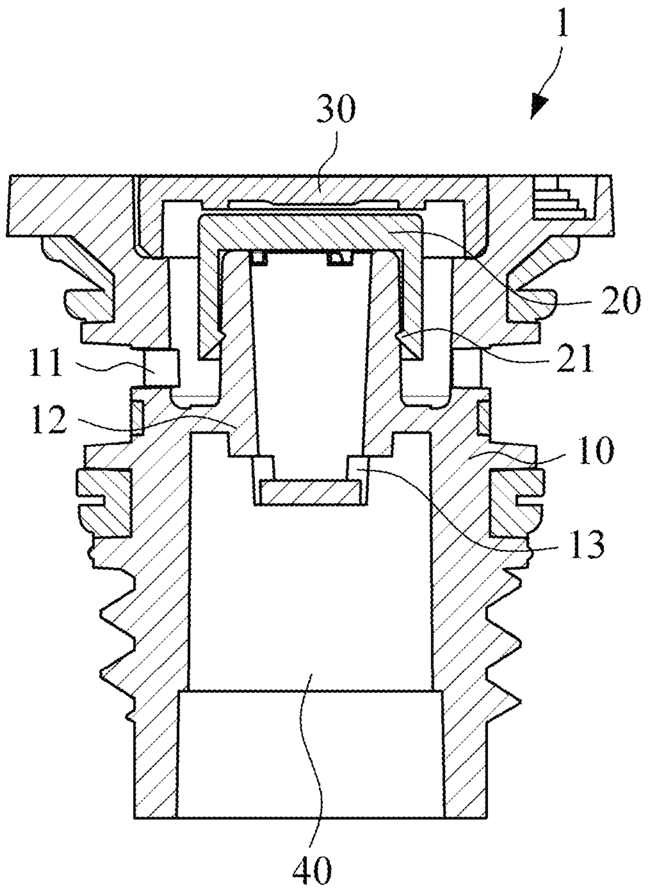
FIG. 3 is a cross-sectional view illustrating the safety valve illustrated in FIG. 1.
Figure 4:
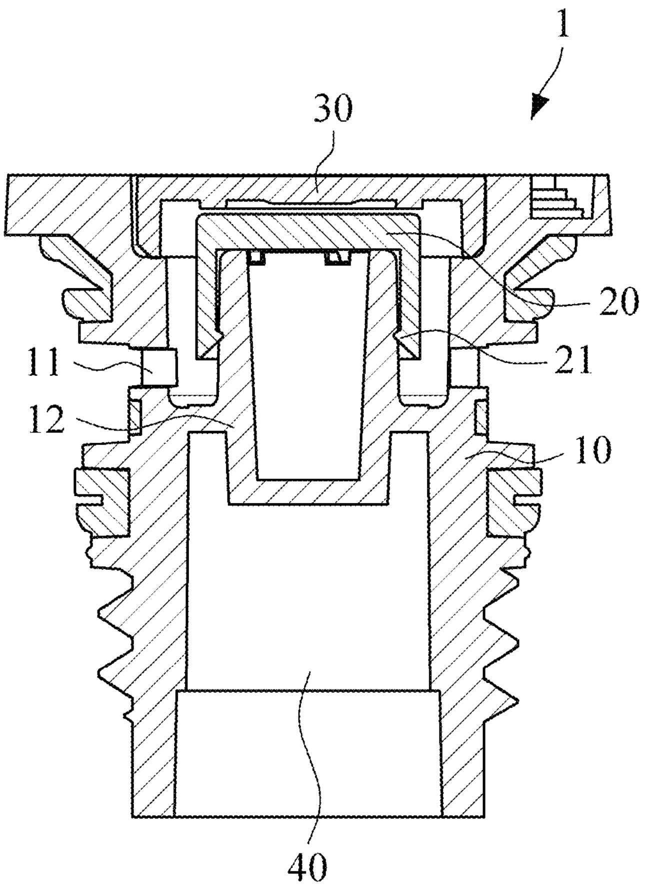
FIG. 4 is another cross-sectional view illustrating the safety valve illustrated in FIG. 1.
Figure 5:
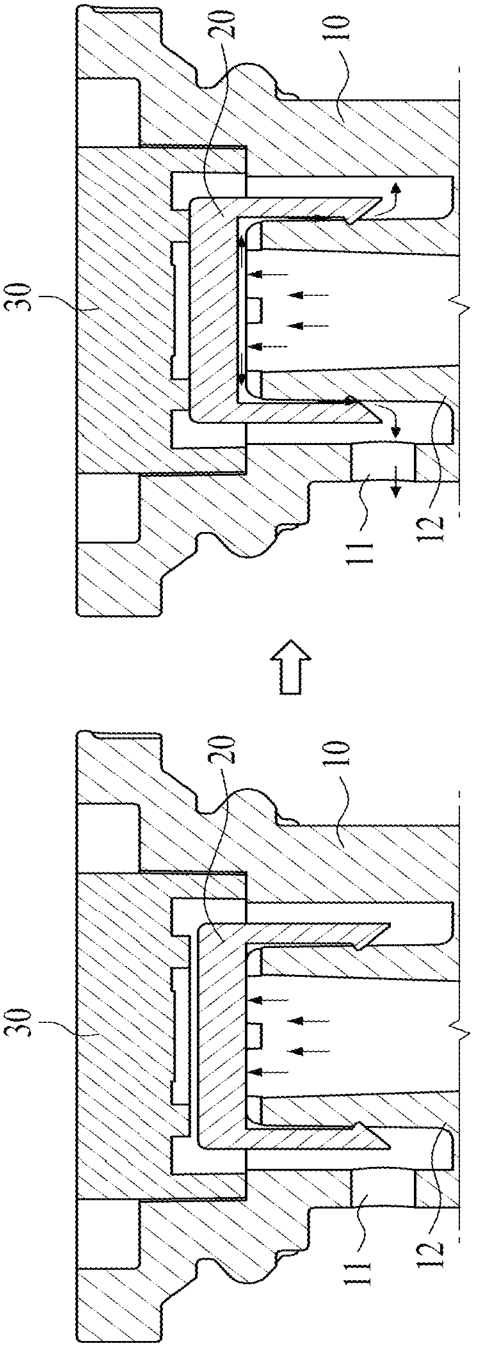
FIG. 5 is a view illustrating an operation of the safety valve illustrated in FIG. 1.

FIG. 1 is a perspective view illustrating a safety valve according to one embodiment of the present invention, FIG. 2 is an exploded perspective view illustrating the safety valve illustrated in FIG. 1, and FIG. 3 is a cross-sectional view illustrating the safety valve illustrated in FIG. 1. FIG. 4 is another cross-sectional view illustrating the safety valve illustrated in FIG. 1, and FIG. 5 is a view illustrating an operation of the safety valve illustrated in FIG. 1.

A configuration and operation of a safety valve according to the present invention will be described with reference to FIGS. 1 to 5.

First, the safety valve according to the present invention is a device which is mounted on a battery and operates to maintain a constant internal pressure in the battery when a predetermined pressure or more is applied to the battery.

As illustrated in FIGS. 1 to 5, a safety valve 1 includes a main body 10, a sub body 12, a cap membrane 20, and a cover 30.

The main body 10 has a hollow structure formed so that a top communicates with a bottom, and a discharge hole 11 is provided in one side surface of an upper portion of the main body 10. In addition, an inflow hole 40 is provided in a lower portion of the main body 10. The inflow hole 40 is connected to a battery.

The sub body 12 is formed to protrude from an inner circumferential surface of the main body 10, and a through hole 13 is formed in one side surface of a lower portion of the sub body 12. The sub body 12 may be formed in a shape of a cylindrical cup. The through hole 13 is formed in one side surface of the lower portion of the cup. The sub body 12 may have a structure in which most of the lower portion of the sub body 12 is closed and only a part of the sub body 12 is open. Accordingly, in the cross-sectional view of FIG. 3, one side surface of the lower portion is open, and in the cross-sectional view of FIG. 4, the lower portion is closed.

The main body 10 and the sub body 12 may be integrally formed of a plastic by injection molding.

The cap membrane 20 is formed so that a cross section of the cap membrane 20 has a "⊂" shape to cover an upper portion of the sub body 12 using a weight of the cap membrane 20. As illustrated in the drawings, the cap membrane 20 may have a cylindrical shape of which one side surface is closed. The cap membrane 20 may be formed of a flexible material such as rubber.

The cover 30 opens or closes the upper portion of the main body 10. The cover 30 may also have a cylindrical shape of which one surface is closed. The cover 30 may be manufactured of a plastic by injection molding.

A protrusion 21 is formed on an end portion of the cap membrane 20 to be in line contact with an outer surface of the sub body 12.

In the safety valve 1 formed as described above, the cap membrane 20 normally covers the upper portion of the sub body 12 using the weight, the protrusion 21 of the cap membrane 20 is in line contact with the outer surface of the sub body 12, and thus, even when gas is introduced through the inflow hole 40, the gas is not discharged to the outside until a pressure of the gas reaches a predetermined pressure. However, when the pressure of the gas introduced through the inflow hole 40 exceeds the predetermined pressure or more, the cap membrane 20 moves upward by the pressure of the gas, legs of the cap membrane 20 are spread outward, and thus the protrusion of the cap membrane 20 is separated from the outer surface of the sub body 12. Accordingly, the gas introduced through the inflow hole 40 is discharged to the outside through the through hole 13 of the sub body 12, the upper portion of the sub body 12, the outer surface of the sub body 12, and the discharge hole 11. As the gas introduced through the inflow hole 40 is discharged to the outside as described above, the predetermined pressure is maintained in the battery connected to the safety valve 1. Accordingly, a function and a lifetime of the battery are improved.

As described above, the safety valve 1 according to the present invention has a simple configuration and a small operating pressure error and effectively discharges gas in the battery.

Figure 6:
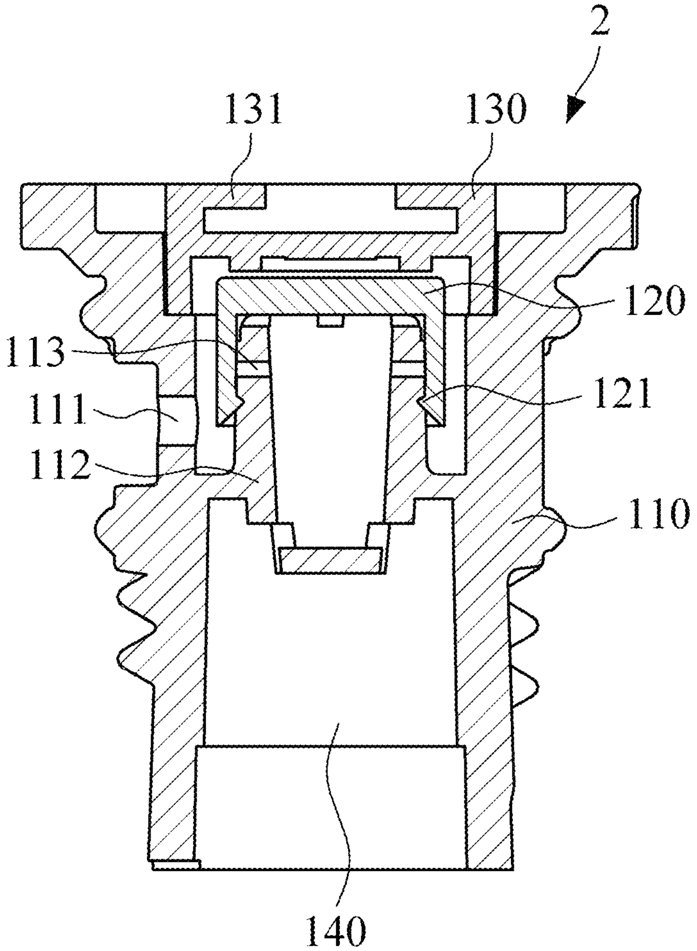
FIG. 6 is a cross-sectional view illustrating a safety valve according to another embodiment of the present invention.

Differences between a safety valve 2 illustrated in FIG. 6 and the safety valve 1 illustrated in FIGS. 1 to 4 are that an air vent 113 is formed in a side surface of a sub body 112 and a hook protrusion 131 protruding inward along an edge of an upper surface of a cover 130 is formed.

First, in a case in which the air vent 113 is formed in the side surface of the sub body 112, when a pressure of gas introduced through an inflow hole 40 exceeds a predetermined pressure, legs of a cap membrane 120 are spread outward by the pressure of the gas, a protrusion 121 of the cap membrane 120 is separated from an outer surface of the sub body 112. Accordingly, the gas introduced through the inflow hole 140 is discharged to the outside through the air vent 113 and the discharge hole 111 of the sub body 112. That is, even when the pressure of the gas is not enough to move the cap membrane 120 upward, the gas can be discharged to the outside through the air vent 113. The predetermined pressure can be maintained in the battery by effectively discharging the gas in the battery as described above.

In addition, when the hook protrusion 131 protruding inward along the edge of the upper surface of the cover 130 is formed, the cover 130 may be separated from a main body 110 using the hook protrusion 131. Accordingly, the inside of the main body 110 of which an upper portion is open may be observed, and a necessary measure may be taken. For example, a weight plate on the cap membrane, which will be described below, can also be replaced, added, or removed.

Figure 7:
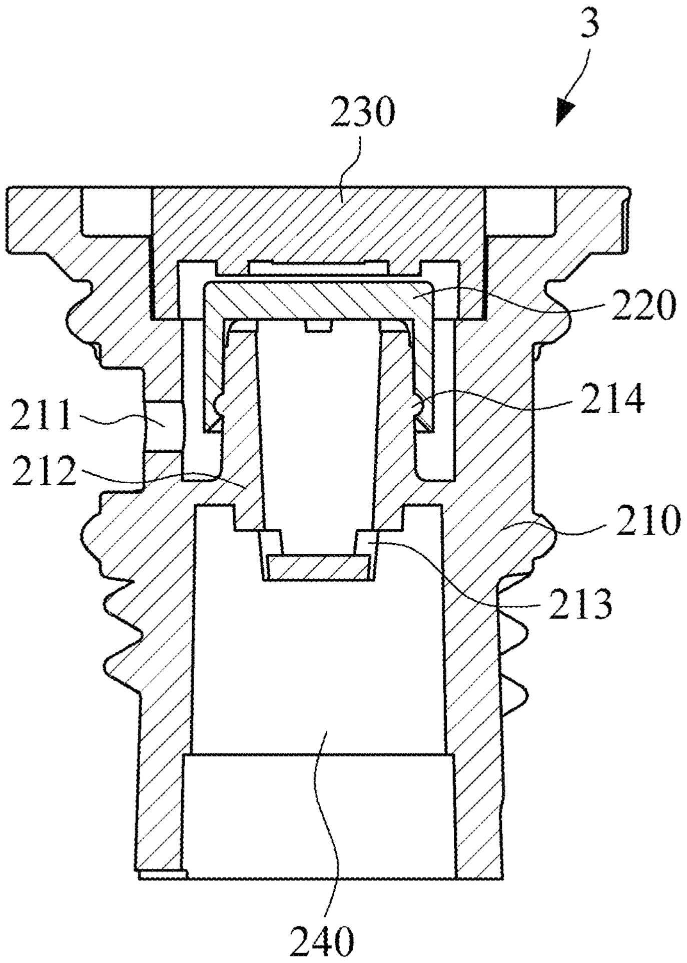
FIG. 7 is a cross-sectional view illustrating a safety valve according to still another embodiment of the present invention.

FIG. 7 is a cross-sectional view illustrating a safety valve according to still another embodiment of the present invention.

A difference between a safety valve 3 illustrated in FIG. 7 and the safety valve 1 illustrated in FIGS. 1 to 4 is that, in the safety valve 1 illustrated in FIGS. 1 to 4, the protrusion 21 is formed on the end portion of the cap membrane 20 and is in line contact with the outer surface of the sub body 12, but, in the safety valve 3 illustrated in FIG. 7, a protrusion 214 is formed on an outer surface of a sub body 212 and is in line contact with an end portion of the cap membrane 220. The safety valve 3 further includes a cover 230 for opening or closing an upper portion of the main body 210.

Figure 8:
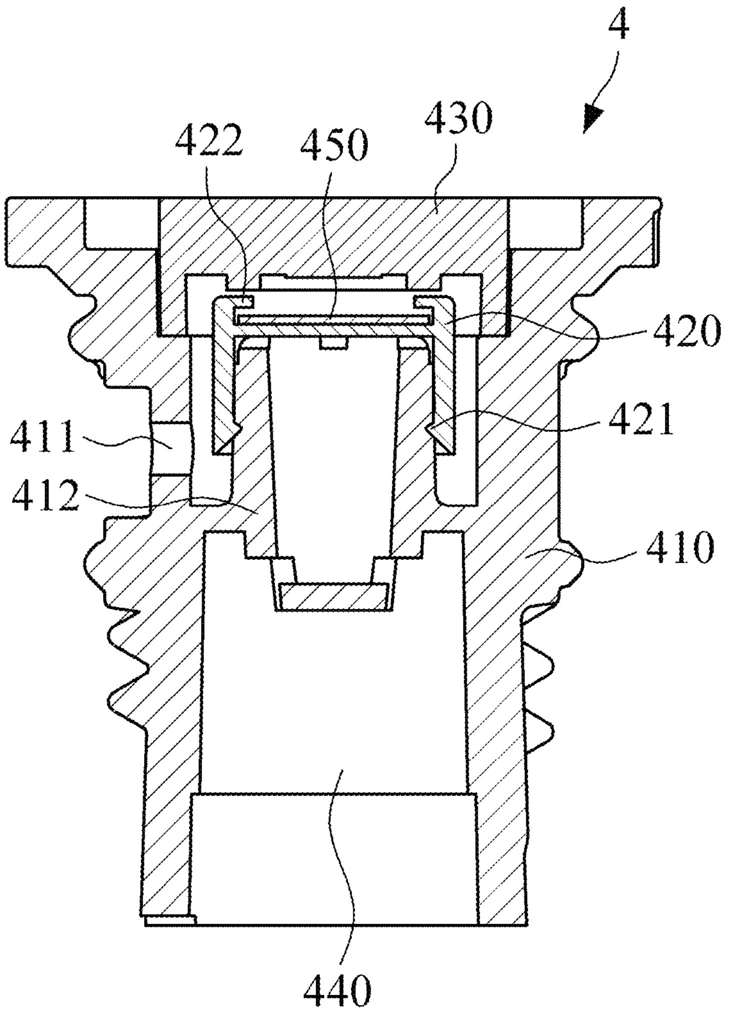
FIG. 8 is a cross-sectional view illustrating a safety valve according to yet another embodiment of the present invention.

FIG. 8 is a cross-sectional view illustrating a safety valve according to yet another embodiment of the present invention.

As illustrated in FIG. 8, in a safety valve 4, a hook part 422 protruding inward along an edge of an upper surface of the cap membrane 420 may be formed, and a weight plate 450 may be seated inside the hook part. The safety valve 4 further includes a cover 430 for opening or closing an upper portion of the main body 410. In this case, a force of the cap membrane 420 pressing an upper surface of a sub body 412 may be adjusted by changing a thickness and material of the weight plate 450 or by increasing or decreasing the number of weight plates 450. Accordingly, a magnitude of a predetermined pressure at which the safety valve operates can be adjusted as desired by a user.

Figure 9:
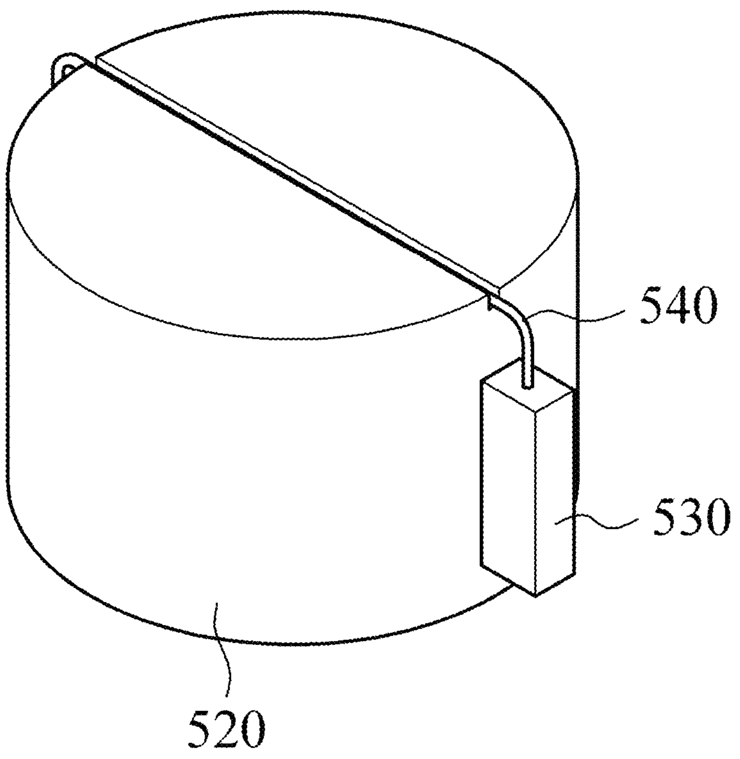
FIG. 9 is a view illustrating a cap membrane according to one embodiment of the present invention.

FIG. 9 is a view illustrating a cap membrane according to one embodiment of the present invention.

A seating groove is formed in an upper surface of a cap membrane 520 illustrated in FIG. 9, and the cap membrane 520 further includes a weight adjusting member 540 including weights 530 on two ends of the weight adjusting member 540 and seated in the seating groove. When the cap membrane 520 further includes the weight adjusting member 540 as described above, a force of the cap membrane 520 pressing an upper surface of sub body may be adjusted by changing weights of the weights 530. Accordingly, a magnitude of a predetermined pressure at which a safety valve operates can be adjusted as desired by a user.

Meanwhile, although not illustrated in the drawings, ventilation grooves may be formed at predetermined intervals in an upper surface of a sub body. In this case, gas may be discharged from the inside of the sub body to the outside through the ventilation grooves. That is, the gas may be discharged to the outside through the ventilation grooves even when a pressure of the gas is not enough to move a cap membrane upward. A predetermined pressure can be maintained in a battery by effectively discharging the gas in the battery as described above.

A safety valve according to the present invention effectively discharges gas in the battery to maintain a constant pressure in a battery.

In addition, a safety valve according to the present invention maintains a constant pressure in the battery to improve a function and a lifetime of a battery.

The present invention has been described with reference to embodiments illustrated in the accompanying drawings, but the embodiments are merely exemplary. It will be understood by those skilled in the art that various modifications and equivalent other embodiments are possible. Therefore, the scope of the present invention is defined by the appended claims.

What is claimed is:

1. A safety valve which is mounted on a battery and operates to maintain a predetermined internal pressure in the battery when the predetermined pressure or more is applied to the battery, the safety valve comprising:

a main body which has a hollow structure formed so that a top communicates with a bottom and a discharge hole in one side surface of an upper portion;

a sub body which is formed to protrude from an inner circumferential surface of the main body, wherein a through hole is formed in one side surface of a lower portion of the sub body;

a cap membrane of which a cross section has a "⊂" shape so that the cap membrane is in close contact with an upper portion of the sub body to close the upper portion of the sub body due to a weight of the cap membrane or moves upward from the upper portion of the sub body to open the upper portion of the sub body and which has a circular cap shape; and a cover which opens or closes the upper portion of the main body, wherein a protrusion is formed on an inner circumferential surface of an end portion of the cap membrane, when a pressure in the sub body is less than the predetermined pressure, the cap membrane is in close contact with the upper portion of the sub body due to the weight of the cap membrane, and the protrusion is in line contact with an outer circumferential surface of the sub body, and when a pressure of the sub body is greater than or equal to the predetermined pressure, the cap membrane moves upward from the sub body to open the upper portion of the sub body, and the protrusion is separated from the outer circumferential surface of the sub body, and wherein a hook part protruding inward along an edge of an upper surface of the cap membrane is formed, and a weight plate is seated inside the hook part.

2. The safety valve of claim 1, wherein the protrusion is a single protrusion which is the only protrusion formed on the inner circumferential surface of the end portion of the cap membrane.

* * * * *